United States Patent
Chari et al.

(10) Patent No.: US 7,489,932 B2
(45) Date of Patent: Feb. 10, 2009

(54) CHANNEL ASSIGNMENTS WITHIN A MESH NETWORK

(75) Inventors: Amalavoyal Chari, San Francisco, CA (US); Cyrus Behroozi, Menlo Park, CA (US); Devabhaktuni Srikrishna, San Mateo, CA (US)

(73) Assignee: Tropos Networks, Sunnyvale, CA (US)

( * ) Notice: Subject to any disclaimer, the term of this patent is extended or adjusted under 35 U.S.C. 154(b) by 880 days.

(21) Appl. No.: 10/861,767

(22) Filed: Jun. 3, 2004

(65) Prior Publication Data

US 2005/0271006 A1    Dec. 8, 2005

(51) Int. Cl.
*H04W 40/00* (2006.01)

(52) U.S. Cl. .................................. 455/447; 375/132
(58) Field of Classification Search .................. 455/7, 455/11.1, 13.1, 16, 447, 450, 451, 443; 370/329, 370/341; 375/132

See application file for complete search history.

(56) References Cited

U.S. PATENT DOCUMENTS

| 6,597,919 | B1 | 7/2003 | Kumar et al. |
| 6,704,301 | B2 | 3/2004 | Chari et al. |
| 7,031,293 | B1 * | 4/2006 | Srikrishna et al. ............ 370/348 |
| 2003/0137993 | A1 * | 7/2003 | Odman .......................... 370/468 |
| 2004/0100929 | A1 * | 5/2004 | Garcia-Luna-Aceves .... 370/338 |
| 2007/0258508 | A1 * | 11/2007 | Werb et al. .................... 375/140 |

\* cited by examiner

*Primary Examiner*—Tu X Nguyen
(74) *Attorney, Agent, or Firm*—Brian R. Short

(57) ABSTRACT

Embodiments of methods of assigning a channel to a link of an access node within a wireless mesh network, is disclosed. The method includes the access node receiving beacons over multiple channels, from at least one upstream device, and the access node selecting an uplink channel based upon the received beacons. Additional methods include the access node selecting a downlink channel so that different channels are assigned to consecutive links within a data path between a gateway and a down stream device. The different channels can include non-overlapping channels, or a combination of non-overlapping and at least partially overlapping channels. The method can further include selecting a downstream link channel based upon predetermined sequences of channel selections, and a hop count of the access node.

30 Claims, 9 Drawing Sheets

CHANNEL ASSIGNMENTS WITHIN A MESH NETWORK

FIELD OF THE INVENTION

The invention relates generally to network communications. More particularly, the invention relates to a method and apparatus for channel assignments within a mesh network.

BACKGROUND OF THE INVENTION

Wireless device communication is becoming increasingly prevalent. The wireless communication can include wireless devices, a source and destination, communicating directly with each other. For example, a cellular phone communicates with a cellular base station to provide voice connectivity to the public switched telephone network. Another example is a wireless local area network where wireless client devices communicate with an access point.

The data transfer of the communication can be one-way, from the source to the destination, or two-way, where data traffic also travels from the destination to the source. The maximum rate of throughput of data between the source and the destination, hereafter referred to simply as throughput, is an important quantity that characterizes the performance of the data channel between the source and destination. It is desirable to increase the throughput as much as possible.

In certain cases, it is desirable for the source and destination wireless devices to route or relay their data transmission through intermediate wireless devices. These intermediate devices are generally referred to as routers, repeaters, or relays. The intermediate devices may be needed when the source and destination are not within transmission range of each other. Other wireless devices can be used to relay the data forming a chain from the source to the destination, with each link in the chain being a wireless device is in transmission range of the originating device. The number of wireless devices in the chain may be as small as one, or as large as need be.

FIG. 1 shows a wire network 110 that can communicate with a destination via intermediate wireless routers 120, 130, 140, 150. The dashed lines between the routers indicate a link that has been formed between those routers. For example, node 120 can communicate directly with node 130, and vice-versa. However, to reach node 140, node 130 must communicate through nodes 120, and 140, and the network 110.

A half-duplex transceiver is a wireless device that can either transmit or receive, but not both at the same instant of time. An example of a half-duplex transceiver is that provided by a personal computer with an IEEE 802.11 interface. Wireless devices may also consist of a separate transmitter and receiver at each node. If transmitter and receiver can transmit and receive data from another node at the same time, the wireless device is called full-duplex transceiver. An example of a full-duplex transceiver is an IS-95 CDMA cell phone.

One prior art method of implementing of a chain or a mesh of wireless devices is used in wireless ad-hoc networks, as described by MANET, DARPA SURAN, etc. Two wireless devices communicate with each other by leveraging peer wireless devices to route or relay the data. The applications envisioned in such networks included battlefield (military) communications and mobile (civilian) networks.

Another prior art method that forms a chain of wireless devices is the transceivers and full-duplex repeaters that constitute the infrastructure of Metricom's network [U.S. Pat. No. 5,479,400]. The repeaters sit atop street lamp poles and relay information from client user modems to wired access points and vice-versa.

Wireless devices must be equipped with antennas in order to receive and transmit data. Omni-directional antennas transmit or receive signals with equal strength in all directions in the horizontal plane. If the antennas are not omni-directional, they are known as directional antennas, and these have radiation patterns that are not circularly symmetric in the horizontal plane.

Directional links are overly restrictive for many forms of terrestrial communication since they permit communication only a certain fixed direction at any given instant of time. For applications such as the prior art mentioned above, MANET and DARPA SURAN, directional links (in contrast to omni-directional links), are not usable since they would prevent formation of an ad-hoc mesh network between wireless devices in arbitrary directions. In these applications, there may not be prior knowledge of the direction between a given wireless device and another wireless device. Therefore aiming antennas with directional links presents a difficulty, especially when setting up communication using a chain of wireless devices that may be reconfigured based on changes in network of wireless devices including the introduction or malfunction of one of the devices.

It is desirable to have an apparatus and method for providing high throughput of data transmitted through a mesh network between a gateway and a client.

SUMMARY OF THE INVENTION

The invention includes a methods and an apparatus for assigning channels to links of an access node within a wireless mesh network.

A first embodiment includes a method of assigning a channel to a link of an access node within a wireless mesh network. The method includes the access node receiving beacons over multiple channels from at least one upstream device, and the access node selecting an uplink channel based upon the received beacons.

Additional methods include the access node selecting a downlink channel so that different channels are assigned to consecutive links within a data path between a gateway and a down stream device. The different channels can include non-overlapping channels, or a combination of non-overlapping and at least partially overlapping channels. The method can include selecting the downstream link channel based upon predetermined sequences of channel selections, and a hop count of the access node. The beacons can originate at the gateway.

Other aspects and advantages of the present invention will become apparent from the following detailed description, taken in conjunction with the accompanying drawings, illustrating by way of example the principles of the invention.

DETAILED DESCRIPTION

Figure 1:
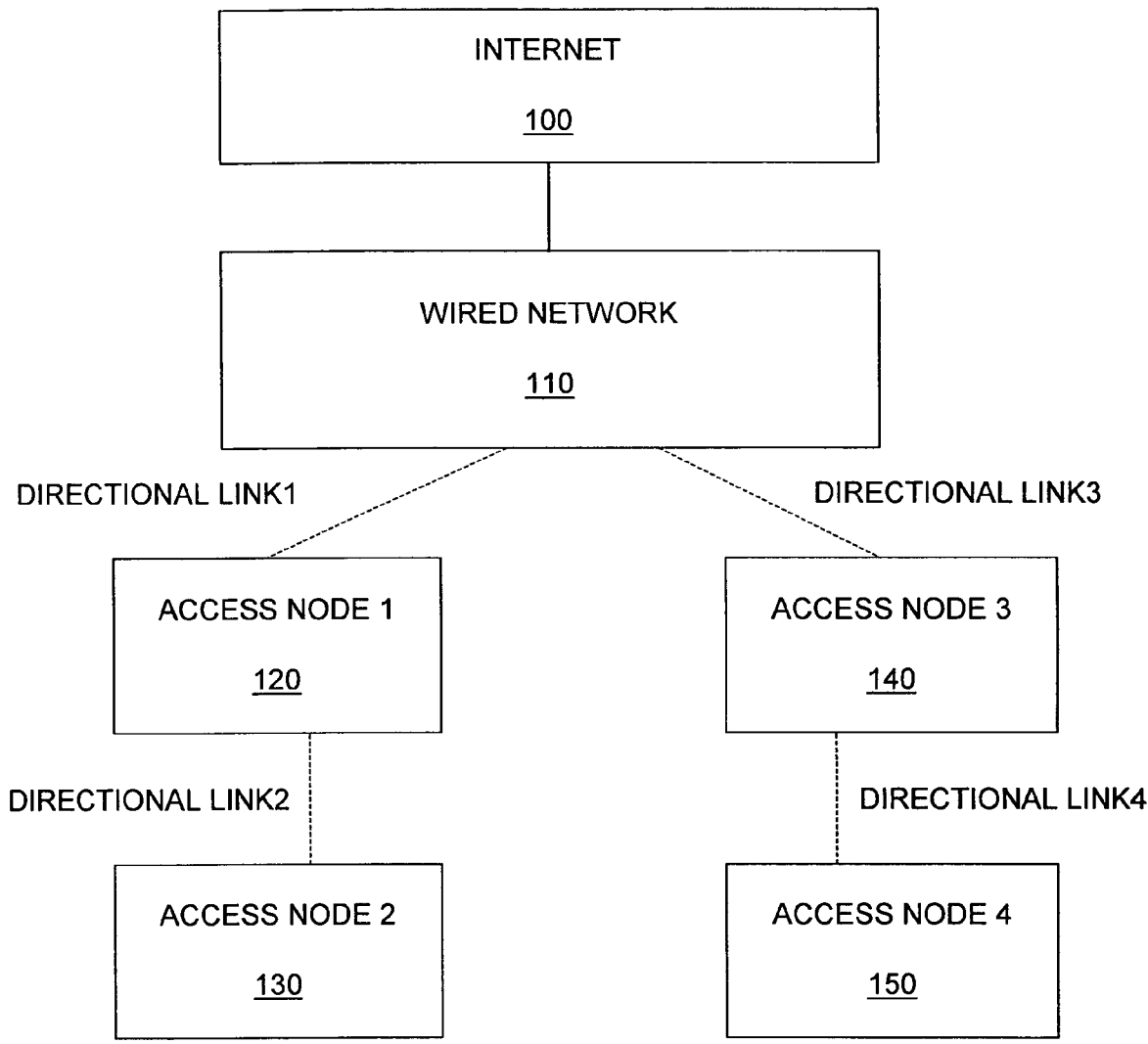
FIG. 1 shows a mesh network for providing communication between a source and a destination.

As shown in the drawings for purposes of illustration, the invention is embodied in a method and apparatus for assigning channels to links of access nodes within a wireless mesh network.

Figure 2:
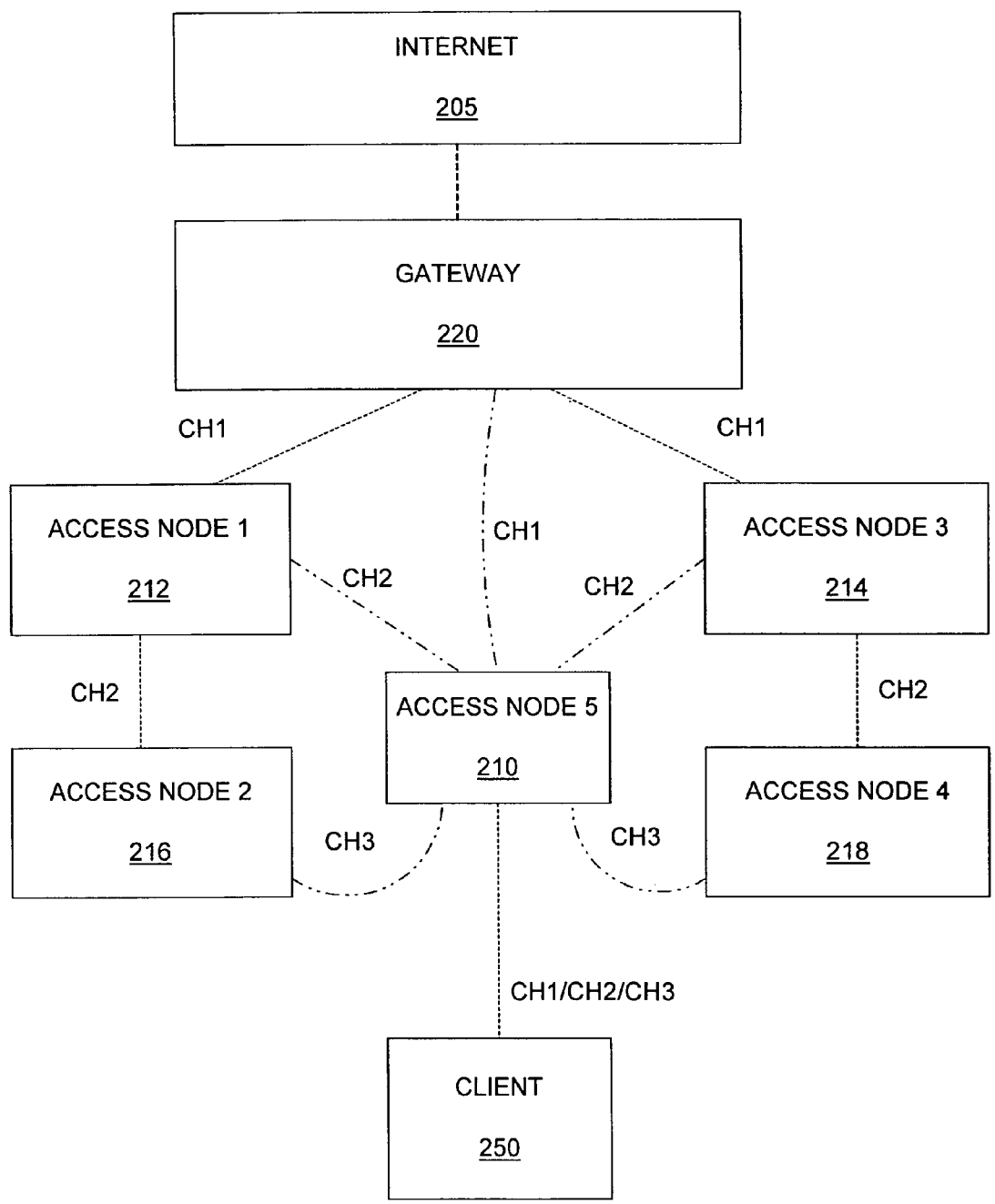
FIG. 2 shows a mesh network depicting an access node receiving beacons over multiple channels, allowing the access node to make an uplink channel selection.

FIG. 2 shows a mesh network depicting an access node 210 receiving beacoris over multiple channels, allowing the access node 210 to make an uplink channel selection. The mesh network includes a gateway 220, access nodes 210, 212, 214, 216, 218, a client 250, and a network 205.

The gateway 220 of FIG. 2 is an originator of beacons. The gateway 220 can be wire connected, or wirelessly connected to the network 205. The beacons are routing packets that carry information about routing paths. The beacons are transmitted from the gateway 220 for reception by the access nodes. Access nodes that are able to receive the beacons from the gateway 220, can route data to the gateway 220 if the access node selects the gateway 220 over other gateways that also transmit beacons (which can be over the same channel (CH1), or different channels). Generally, the access nodes receive routing beacons, select a routing path, modify the beacons, and retransmit the modified beacons for reception by other downstream devices (downstream devices can be other access nodes or clients).

Access nodes are devices having one or more network interfaces, and are capable of routing data traffic. An access node can provide a client device (such as client 250) with a network connection.

The client 250 generally can be any type of computing device, such as, a laptop computer, a personal computer, a PDA or even a cell phone. The only requirement of the client 250 is that the client 250 must be able to communicate over the available transmission channels.

An upstream path is a data path between a device (access node or client) and a gateway. A downstream path is in the opposite direction as an upstream path.

As shown in FIG. 2, the gateway 220 transmits beacons over a first channel (CH1). Access nodes 212, 214 both receive the beacons over the first channel (CH1). The access nodes 212, 214 are generally referred to as first layer access nodes, and are one hop from the gateway 220. The access nodes 212, 214 modify the beacons to include their routing information and the hop count (hop count of one). The routing information provides a data path back to the gateway 220. The modified beacons are retransmitted over a second channel (CH2).

Second layer access nodes 216, 218 receive the modified beacons over the second channel (CH2). The second layer access nodes 216, 218 have a hop count of two. The second layer access nodes 216, 218 again modify the received beacons to include their routing information, and the new hop count (hop count of two). The second layer access nodes 216, 218 retransmit the modified beacons over a third channel (CH3).

As shown in FIG. 2, access node 210 can receive beacons from the gateway 220 over the first channel (CH1), from the first layer access nodes 212, 214 over the second channel (CH2), and from the second layer access nodes 216, 218 over the third channel (CH3).

Generally, the access node 210 performs a quality check on the received beacons, and selects the upstream data path connection based upon the quality check. The selection determines the uplink channel selection of the access node 210. That is, if the beacons received from the gateway 220 are determined to be the best quality, the first channel (CH1) is selected as the uplink channel, if beacons from either of the first layer access nodes 212, 214 are determined to be the best quality, the second channel (CH2) is selected as the uplink channel, and if the beacons received from the second layer access nodes 216, 218 are determined to be the best quality, the third channel (CH3) is selected as the uplink channel.

An embodiment of the access node 210, includes the access node 210 periodically switching its uplink channel to determine whether the quality of the beacons over different channels has changed. If a beacon over a different channel than the present becomes better than the present one, the access node can change its uplink channel selection. Of course, the uplink channel re-selection will typically require a new downlink channel selection as well. A similar embodiment includes the access node simultaneously receiving over all available channels during normal operation. That way, the access node 210 can determine if a better channel is available while not interrupting on going communication with downstream devices. Simultaneous reception can be implemented with multiple radios or through the use of a wideband receiver.

Figure 3:
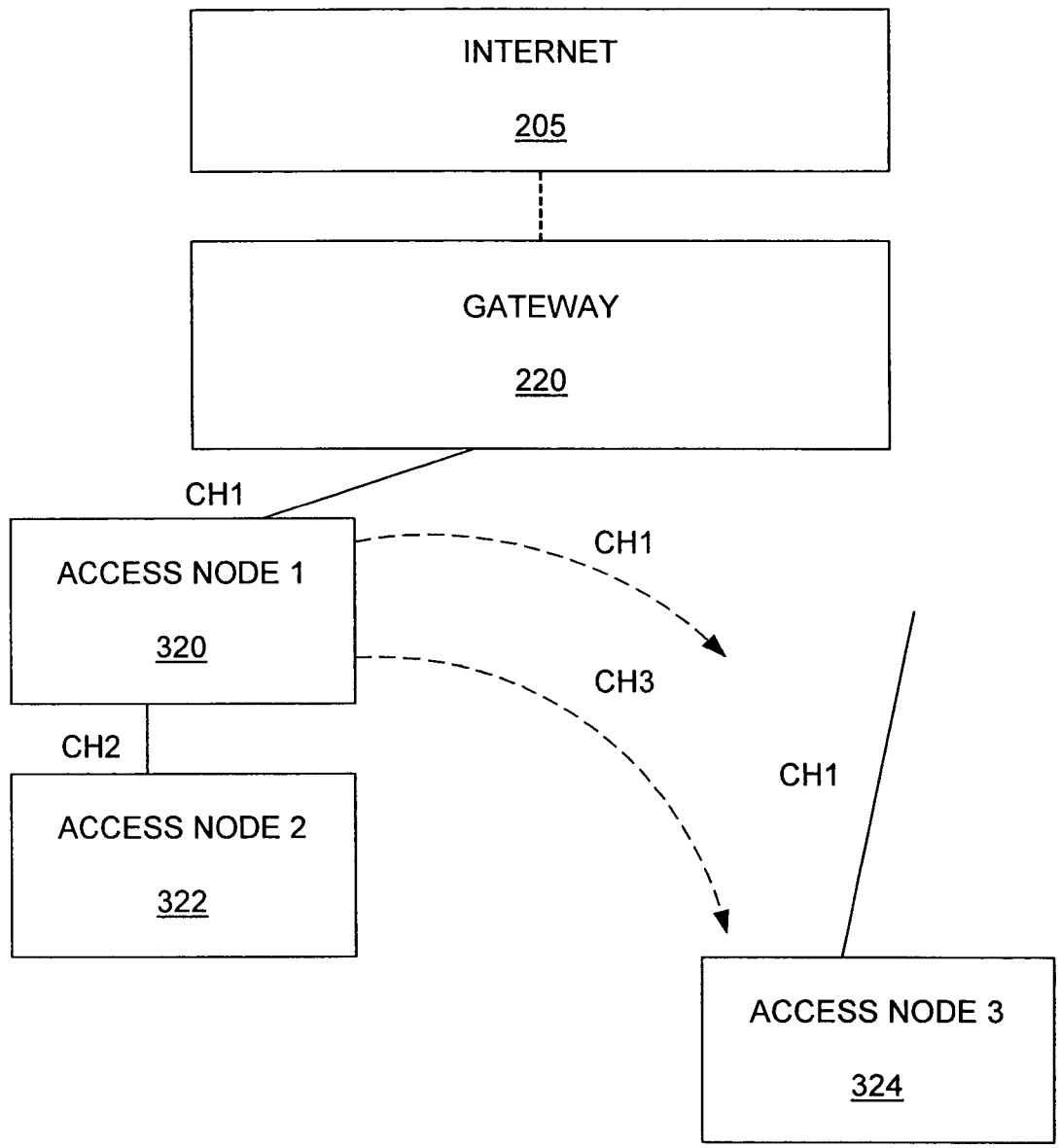
FIG. 3 shows a mesh network in which a channel selection is made.

Another embodiment of the access node 210, includes the access node 210 periodically re-transmitting the modified beacons over different channels. That way, a downstream device receiving beacons over a different channel than the channel the access node 210 is presently transmitting, may determine that the present channel of the access nodded 210 is better than the channel the downstream device is presently using as its uplink (potentially through a different upstream device). For example, FIG. 3 shows a first access node 320 that is communicating with a second access node 322 over a second channel (CH2). The first access node 320 can transmit beacons over multiple channels (CH1, CH2, CH3) so that other access nodes, such as, a third access node 324 which is currently using a first channel (CH1) as its uplink channel, can determine whether to switch its uplink channel to the second channel (CH2) and communicate with the first access node 320.

As shown, the channel selections are made so that different channels are assigned to consecutive links within each of the data paths of the wireless mesh network. A data path is generally defined as path that data travels between a device (access node or client) and a gateway. The channel selections follow predetermined sequences in order to minimize interference between the transmission links as will be described.

The channel selection between the access node 210 and the client 250 is made by the access node 210. The selection is based upon the predetermined sequence of channel links. Depending upon the uplink channel of the access node 210, the downlink channel will be, for example, either the first channel (CH1) (if the uplink channel is the third channel (CH3)), the second channel (CH2) (if the uplink channel is the first channel (CH1)), or the third channel (CH3) (if the uplink channel is the second channel (CH2)).

Beacon Quality Selection

As stated, the selected paths are determined by the quality of the beacons received by an access node. The quality selection can be based upon bit error rate (BER), packet error rate (PER), or signal to noise ratio (SNR) of the received beacons. The quality selection can be based upon a history of beacons received by the access nodes from any (or all) other access nodes and gateways. The history can be incorporated over multiple time scales and be used to make a judgment about the quality and reliability of a path advertised by a beacon. The quality selection may also be based on a variety of other factors including (wired) bandwidth available at the gateway and interference or congestion within the wireless network.

Beacons can be received from multiple gateways or access nodes. In one embodiment, the beacons can be received by an access node on multiple channels. The access node can periodically witch its receive channel in order to receive the beacons over the multiple channels. In another embodiment, each access node periodically switches its beacon transmit channel so that beacons can be sent on all available channels.

For one embodiment, link quality is determined by persistence, i.e. the number of times in the last several routing cycles that the particular beacon was received. For one embodiment, the link quality—reliability that a path to the server shown by the beacon will be available for a reasonable time—is built up as the beacon is received in every cycle. Whenever the beacon is not received in a cycle, the link quality associated with that path is decreased. The beacon is only transmitted if its link quality is sufficiently high. For another embodiment, other link quality factors, such as traffic congestion, battery status of upstream clients, thickness of the pipeline, backend (i.e. server) capacity, latency, or other factors may be used to determine whether the beacon should be rebroadcast.

Figure 4:
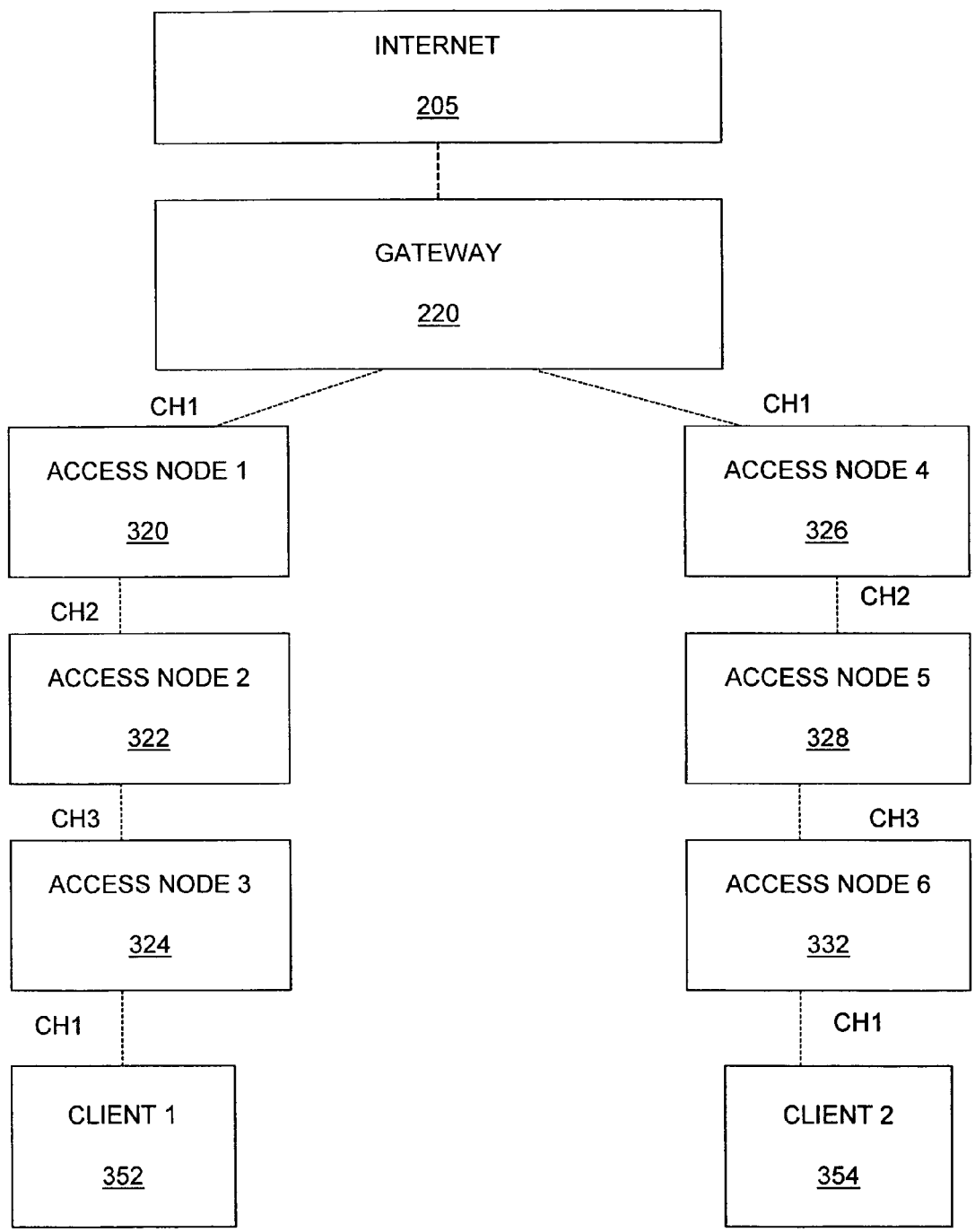
FIG. 4 shows a mesh network that includes channel assignments for links between access nodes.

FIG. 4 shows a mesh network that includes channel assignments for links between access nodes. The mesh network includes a gateway 220, wireless access nodes 320, 322, 324, 326, 328, 332 and clients 352, 354. The clients 352, 354 are connected to the gateway 220 through the access nodes 320, 322, 324, 326, 328, 332 allowing communication between the gateway 220 and the clients 352, 354. Transmission channels are selected for the links between the gateway 220 and each of the access nodes. The selection for each link can take place at the access node, therefore, not requiring a centralized processor. An embodiment includes the communication channels selected for each of the links including non-overlapping communication channels.

The access nodes select both up stream link channels (through beacon selection) and down stream link channels (by following predetermined sequences). The channels selections are made in an attempt to minimize interference between the transmission links of the mesh network.

An embodiment includes the access node receiving reverse beacons from a downstream device, and data path channel sequence selection is based upon information within the reverse beacon. After a beacon is received by every device (access node and clients) every device has the address of an upstream device (gateway or access node), which leads to the gateway. For one embodiment, each access node and client also has a path to the gateway. A reverse beacon is then sent out through the access nodes, up to the gateway. The reverse beacon permits the gateway to establish a full client tree, enabling the gateway to access all down stream devices. Furthermore, the reverse beacon informs each access node what downstream devices access the gateway through this access node. Downstream devices can detect, for example, interference within particular channels. The reverse beacons can include the channel interference information, therefore, allowing channels sequences to be selected to avoid downstream channel selections that compete with an interfering channel.

Channel assignment/selection methods assign communication channels to links within the mesh network to minimize interference, and provide for enhanced data flow through the mesh network. For example, maintaining multiple channels that do not interfere with each other, minimizes interference between access nodes, and increases the throughput of wireless links of the mesh network. By providing a distributed protocol executed at each node, a central server does not need to control the channel assignment of each access node. Therefore, the mesh system may be used for large network, and easily scales from a small network to a large network.

The throughput of a chain of wireless links is limited at least by the throughput of each individual wireless link that makes up the chain and the speed of each intermediate wireless device to transmitting the data it received on to the next wireless device in the chain (i.e. forward data). For wireless devices with omni-directional transmitters, interference is prone to occur between a first pair of wireless devices within a chain, and a second pair of wireless devices within the chain (this can be referred to as self-interference of the chain of wireless links, or simply self-interference) The interference prevents the bandwidth of communication in a chain of links from reaching the rate of a single link.

Interference Between Transmission Links

One form of self-interference arises when, for example, in FIG. 4, access node 320 is transmitting to access node 322, and access node 322 is transmitting to access node 324. The transmission from access node 322 can interfere with the reception at access node 322 of the transmission from access node 320. The MAC/PHY layer protocol standards such as IEEE 802.11b mitigate this form of self-interference by implementing carrier-sensing, such that access node 322 can transmit only when the channel is clear, i.e., neither of its neighbors access node 320 and access node 324 is transmitting. This effectively reduces the effective throughput experienced by any node in the chain to one-half of the link capacity. One way to solve this problem is by having two transceivers at each node, each operating on a different channel or spreading code. By using two transceivers, each node can simultaneously transmit and receive data. By using different channels or spreading codes for the two transceivers, self-interference between the transceivers is reduced, or eliminated.

Another form of self-interference arises when access node 320 is transmitting to access node 322, and access node 324 is transmitting to access node 326. The transmission of access node 324 also propagates to access node 322, and interferes with the transmission from access node 320 to access node 322.

Similarly, if access node 324 attempts to transmit to access node 322 at the same time that access node 320 attempts to transmit to access node 322, the two transmissions will interfere and thereby be disrupted. This form of self-interference is addressed in MAC/PHY layer protocol standards such as the IEEE 802.11b by implementing an RTS/CTS mechanism: when access node 320 has data to send to access node 322, it issues an RTS (Request To Send) control packet to access node 322 that reserves the channel for a certain duration of time. If access node 322 is free to receive data, it responds to access node 320 with a CTS (Clear To Send) control packet that gives access node 320 clearance to send data to access node 322 during the requested interval of time. Any node, other than access node 320 and access node 322, that overhears the RTS or the CTS or both must remain silent for the duration of the transfer from access node 320 and access node 322. A limitation to this configuration is that only one out of every three nodes can be transmitting at a given time. This effectively limits the throughput to one third of the capacity of a single link. This is referred to as the "multi-hop throughput reduction problem." It can be seen that this reduction in throughput is characteristic of mesh networks where data is forwarded across multiple wireless links.

As an example of this situation in practice, consider the unlicensed 2.4 GHz ISM band which is divided into three non-overlapping channels of 22 MHz each. Half-duplex radio chipsets are capable of raw data rates up to 11 Mbps, although the actual throughput experienced in a specific environment may be much lower. If a mesh network of these radios were deployed, the actual throughput experienced between any two nodes separated by more than two hops in the mesh would be no better than ⅓*(11 Mbps)=3.67 Mbps, assuming the links operate at 11 Mbps, because of the multi-hop throughput reduction problem.

To minimize the effect of this form of self-interference, each link can be enabled to operate independently without interference from the transmissions occurring on other adjacent links. Each relay node can be equipped with two (half-duplex) wireless transceivers, one for the "uplink" and one for the "downlink". Each half-duplex transceiver is capable of receiving and transmitting, though not at the same time.

The transmissions from one of the half-duplex transceivers in this setting may cause interference to the reception by the other half-duplex transceiver of another transmission from a more distant radio. This is known as the "near-far problem". For one embodiment, this problem is solved by having the two half-duplex transceivers operate on distinct channels or with different spreading codes in a spread-spectrum system. Due to imperfections in the transceiver design there may be some leakage of the signal (broad side-lobes) outside of the intended frequency band. For one embodiment, filter circuits are used to eliminate or suppress the unwanted side-lobes. For one embodiment, physical separation of the radiating elements (antennas) associated to the distinct half-duplex transceivers is further implemented to mitigate the near-far problem.

The present invention incorporates techniques for minimizing interference between adjacent links and solving the "multi-hop throughput reduction problem", thereby allowing the throughput on a multi-hop link to reach the capacity of a single link and effecting a threefold increase in capacity utilization. The assignment of channels within a mesh network from a set of non-overlapping channels provides some improvement over mesh networks that don't include channel selections of link within the mesh networks, but is still limited in maximum capacity due to self-interference across multiple hops within the mesh network. The embodiments described that include overlapping channels as well, provide channel allocations within mesh networks that increase the availability of capacity.

Communication Channels

In one embodiment, the transceivers on adjacent links operate on different "channels". For one embodiment, the channels are frequency channels. The term "channel" is to be understood in a generalized sense as designating a method of formatting data in such a way as to render it effectively distinguishable from other data transmissions. For instance, a cell-phone transmission may be effectively distinguished from a TV broadcast because they occur on different frequency "channels." On the other hand, a data transmission on a horizontally polarized light-wave can be distinguished from one on a vertically polarized light-wave. Thus, "channels" may be distinguished by polarizations. In the ISM band example, a channel could be one of the eleven frequency bands available for direct-sequence spread-spectrum transmissions. Alternatively, each channel could be a different spreading code in a spread-spectrum CDMA system; or each channel could correspond to a different polarization for the transmitted waveform modulated with the information bits. In one embodiment, this channel assignment scheme is implemented on nodes that have only one wireless interface (transceiver) that is sequentially switched between the uplink and downlink channels (depending on the destination of the transmission)—this solves the multi-hop throughput reduction problem, but the throughput is only one-half of the link capacity because of the half-duplex nature of the radios. In another embodiment, this channel assignment scheme is implemented on nodes that have two wireless interfaces (transceivers), one operating on the "uplink" channel and one operating on the "downlink" channel. In this embodiment, the throughput attains the full link capacity.

Figure 5A:
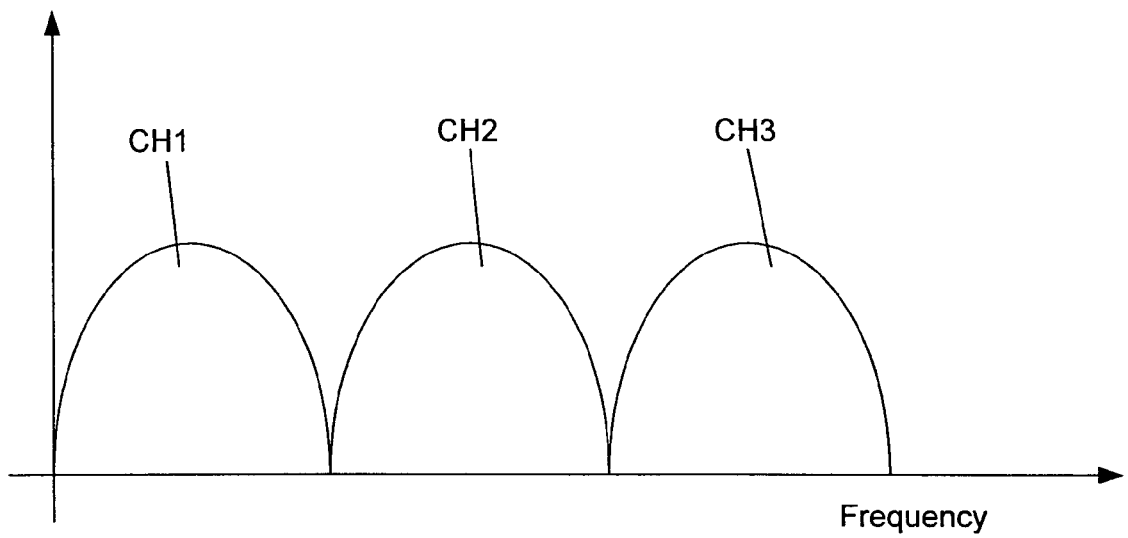
FIG. 5A shows a frequency spectrum of non-overlapping communication channels.

FIG. 5A shows a frequency spectrum of non-overlapping communication channels. The channels CH1, CH2, CH3 each occupy different portions of the frequency spectrum, and signals transmitted over one channel is unlikely to interfere with signals transmitted over another one of the channels.

Within a mesh network, such as shown in FIG. 4, the channels of links within data paths can follow predetermined sequences, to minimize the interference between links. For example, the sequence can be 1-2-3-1-2-3. This sequence of channels within a data path provides optimal throughput. For an 802.11 protocol, the non-over lapping channels correspond to channels 1-6-11.

The sequence selection can be slightly modified. For example, within a mesh network, the access nodes closest to the gateways typically carry the greatest amount of data traffic. Therefore, it may be desirable to provide the greatest isolation between links closest to the gateways. This can be accomplished by placing the channels within the sequence to provide the most isolation near the gateways. For example, the sequence could be modified to 1-3-2, or for an 802.11 protocol, 1-11-6. If the data path is long enough, the sequence repeats.

Figure 5B:
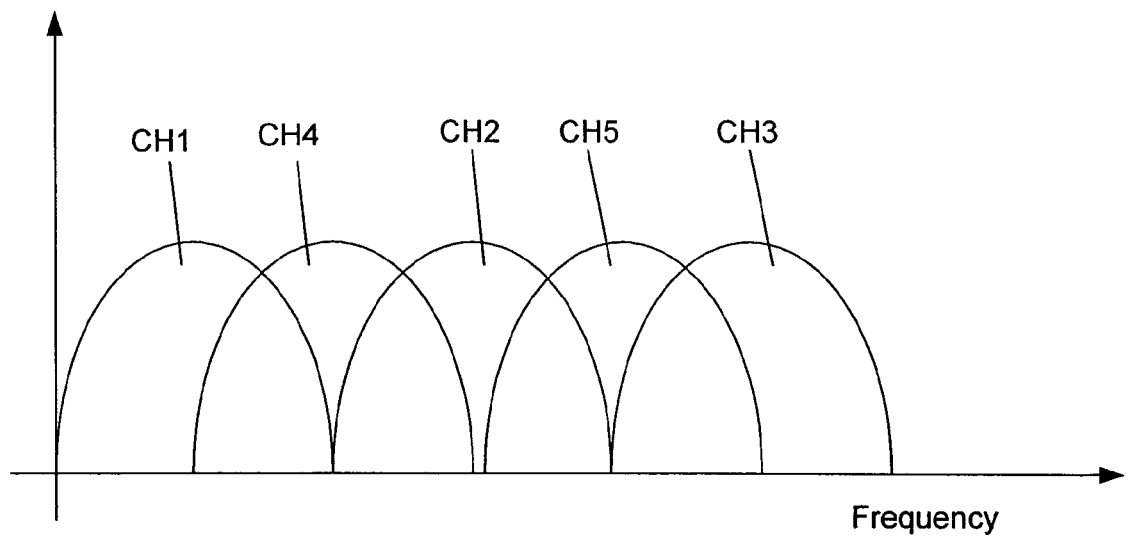
FIG. 5B shows a frequency spectrum of overlapping communication channels.

FIG. 5B shows a frequency spectrum of overlapping communication channels. Here, Channels CH4 and CH5 overlap the frequency allocations of the other channels. Therefore, it is very possible that some interference between signals being transmitted over the channels will interfere with each other.

A mesh network can include channel selection sequences that utilize the over lapping channels shown in FIG. 5B. A possible sequence includes 1-2-3-4-5-1-2-3-4-5. For the 802.11 protocol, the combination of over lapping and non-over lapping channels corresponds to channels 1-6-11-3-8-1-6-11-3-8. The additional channels provide greater utilization of the available frequency spectrum.

Again, it is desirable to have the greatest amount of isolation near the gateways due to the greater data traffic. Therefore, it is desirable to have the non-overlapping channels near the gateways, and the overlapping channels away from the gateways.

Figure 6:
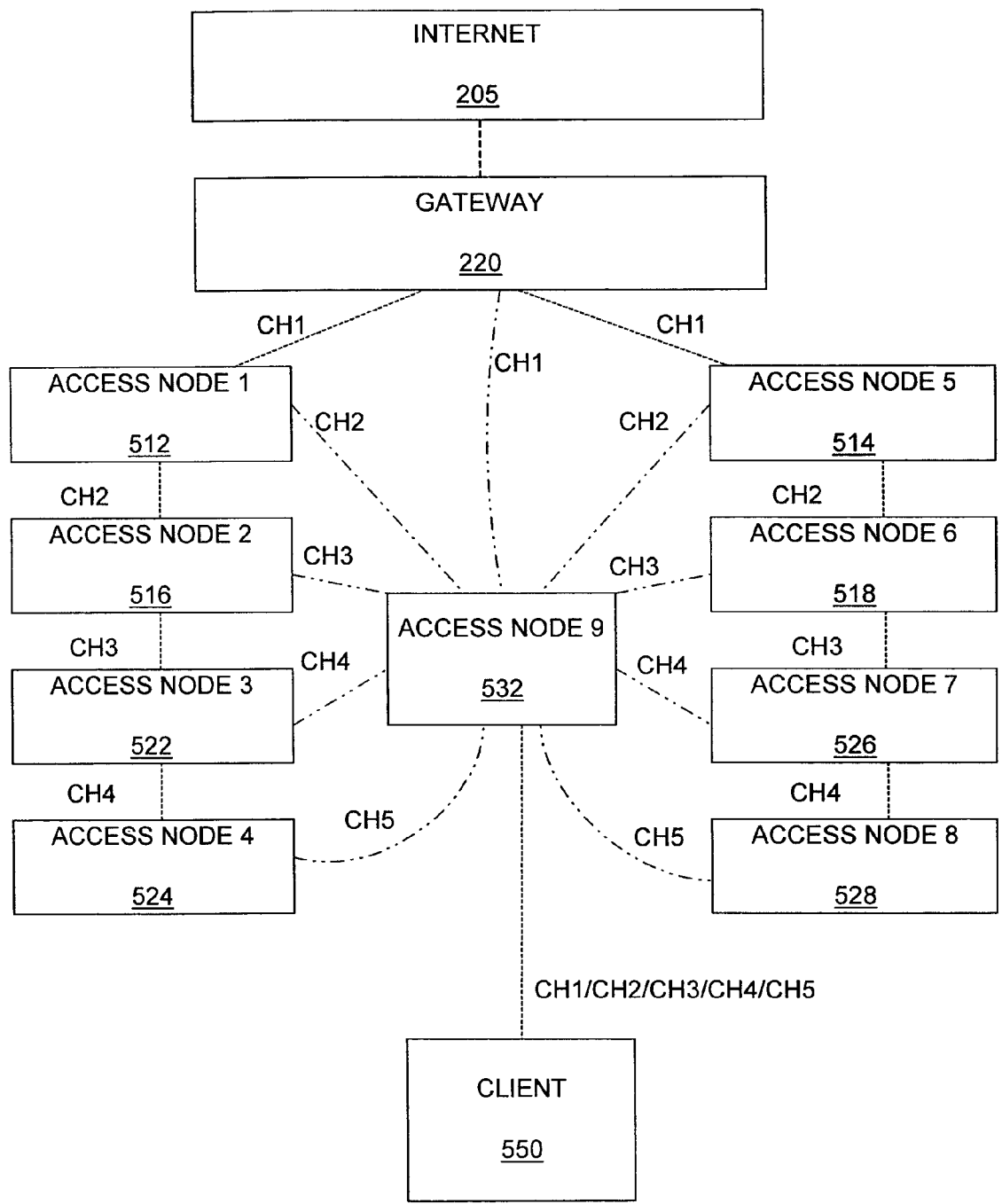
FIG. 6 shows another mesh network depicting an access node receiving beacons over multiple channels, allowing the access node to make an uplink channel selection.

FIG. 6 shows another mesh network depicting an access node receiving beacons over multiple channels, allowing the access node to make an uplink channel selection. This mesh network includes transmission over both non-overlapping and overlapping channels. The access node 532 can potentially receive beacons over as many as five different channels (CH1, CH2, CH3, CH4, CH5). As previously described, the access node 532 selects the uplink channel based upon the quality of the beacons received over the possible channels. Generally, the beacon transmitted over the channel, and from the upstream device having the best quality is selected. For the example shown in FIG. 6, the beacon selection can dictate a selection of any one of the five available overlapping and non-overlapping channels.

As shown in FIG. 6, access node 532 can receive beacons from the gateway 220 over the first channel (CH1), from the first layer access nodes 512, 514 over the second channel (CH2), from the second layer access nodes 516, 518 over the third channel (CH3), from the third layer access nodes 522, 526 over the fourth channel (CH4), and from the fifth layer access nodes 524, 528 over the fifth channel (CH5). Generally, the access node 532 performs a quality check on the received beacons, and selects the upstream data path connection based upon the quality check. The selection determines the uplink channel selection of the access node 532. That is, if the beacons received from the gateway 220 are determined to be the best quality, the first channel (CH1) is selected as the uplink channel, if beacons from either of the first layer access nodes 512, 514 are determined to be the best quality, the second channel (CH2) is selected as the uplink channel, if the beacons received from the second layer access nodes 516, 518 are determined to be the best quality, the third channel (CH3) is selected as the uplink channel, if beacons from either of the third layer access nodes 522, 526 are determined to be the best quality, the fourth channel (CH4) is selected as the uplink channel, and if the beacons received from the fourth layer access nodes 524, 528 are determined to be the best quality, the fifth channel (CH5) is selected as the uplink channel, An embodiment of the access node 532, includes the access node 532 periodically switching its uplink channel to determine whether the quality of the beacons over different channels has changed. If a beacon over a different channel than the present becomes better than the present one, the access node can change its uplink channel selection. Of course, the uplink channel re-selection will typically require a new downlink channel selection as well.

As shown, the channel selections are made so that different channels are assigned to consecutive links within each of the data paths of the wireless mesh network. A data path is generally defined as path that data travels between a device (access node or client) and a gateway. The channel selections follow predetermined sequences in order to minimize interference between the transmission links as will be described.

The channel selection between the access node 532 and the client 550 is made by the access node 532. The selection is based upon the predetermined sequences of channel links. Depending upon the uplink channel of the access node 532, the downlink channel will be, for example, either the first channel (CH1) (if the uplink channel is the fifth channel (CH5)), the second channel (CH2) (if the uplink channel is the first channel (CH1)), the third channel (CH3) (if the uplink channel is the second channel (CH2)), the fourth channel (CH4) (if the uplink channel is the third channel (CH3)), or the fifth channel (CH5) (if the uplink channel is the fourth channel (CH4)).

Figure 7:
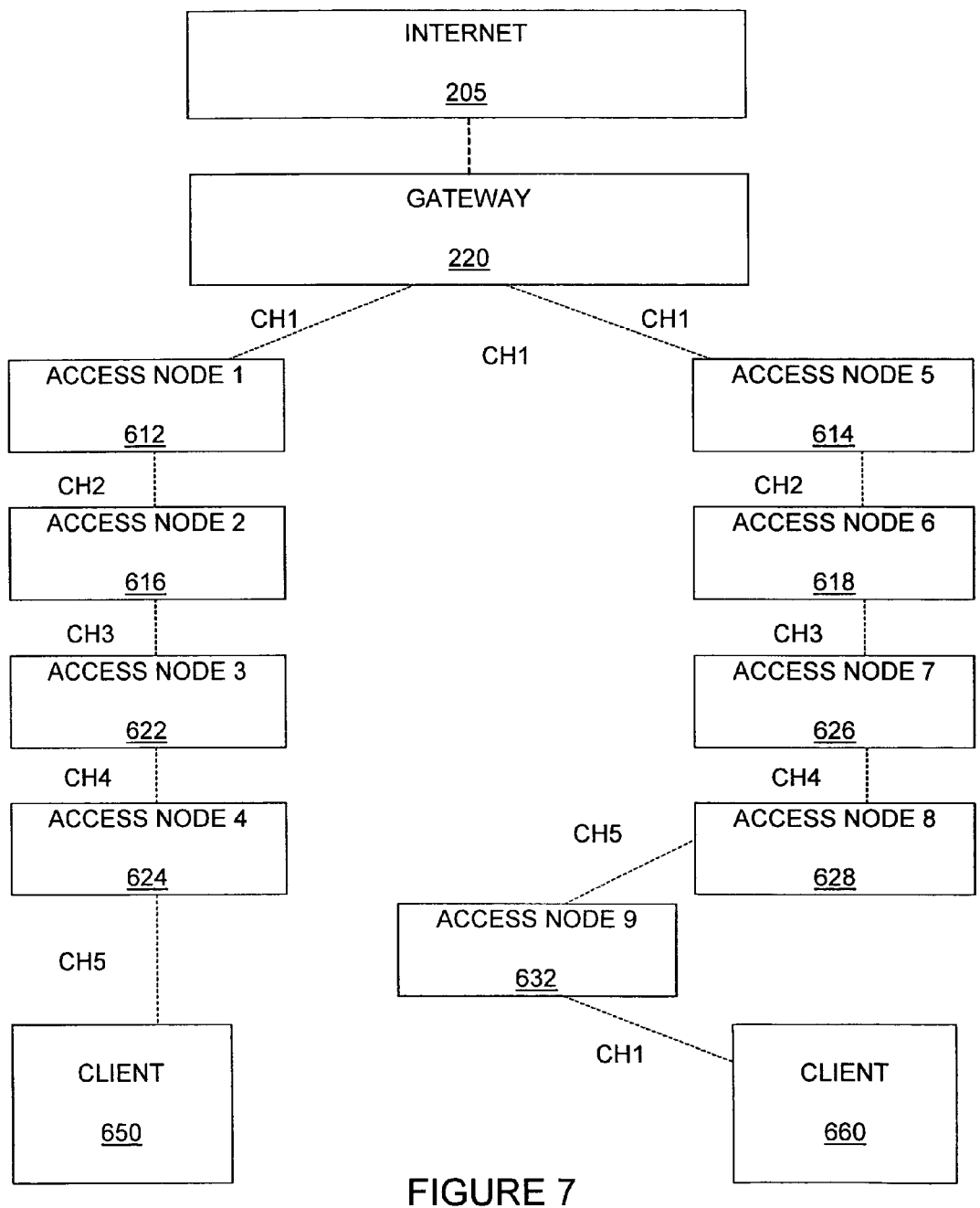
FIG. 7 shows a mesh network that includes channel assignments for links between access nodes, wherein the links include overlapping and non-overlapping channels.

FIG. 7 shows a mesh network that includes channel assignments for links between access nodes, wherein the links include overlapping and non-overlapping channels. Generally, the channels of the links closest to the gateway are non-overlapping channels, and the links away from the gateway can include overlapping channels.

The mesh network includes a gateway 220, wireless access nodes 612, 614, 616, 618, 622, 624, 626, 628, 632 and clients 650, 660. The clients 650, 660 are connected to the gateway 220 through the access nodes allowing communication between the gateway 220 and the clients 650, 660. Transmission channels are selected for the links between the gateway 220 and each of the access nodes. The selection for each link can take place at the access node, therefore, not requiring a centralized processor. An embodiment includes the communication channels selected for each of the links including non-overlapping and overlapping communication channels.

The access nodes select both up stream link channels (through beacon selection) and down stream link channels (by following predetermined sequences). The channels selections are made in an attempt to minimize interference between the transmission links of the mesh network.

Preferred Predetermined Sequences

Given a set of available channels in which a subset of the channels are non-overlapping, there are certain sequences of channels that can be preferred, depending upon multi-hop interference and regulatory restrictions. In the United States, a set of preferred 802.11 channel sequences can include channels 1-6-11-3-8 and 11-6-1-8-3. In Europe, a set preferred 802.11 channel sequences can include channels 1-7-13-4-10 and 13-7-1-10-4. In Japan, a set of preferred 802.11 channels can include 1-8-14-4-11, 14-8-1-11-4, 1-7-14-4-10 and 14-7-1-10-4. It is to be understood, that different protocols can include different channels sequences. The basic premise is that non-overlapping channels can be strategically placed at the start of a sequence, and overlapping channels can be strategically placed at the end of the sequence. The channel sequences are selected to minimize interference between hops of the mesh network.

Figure 8:
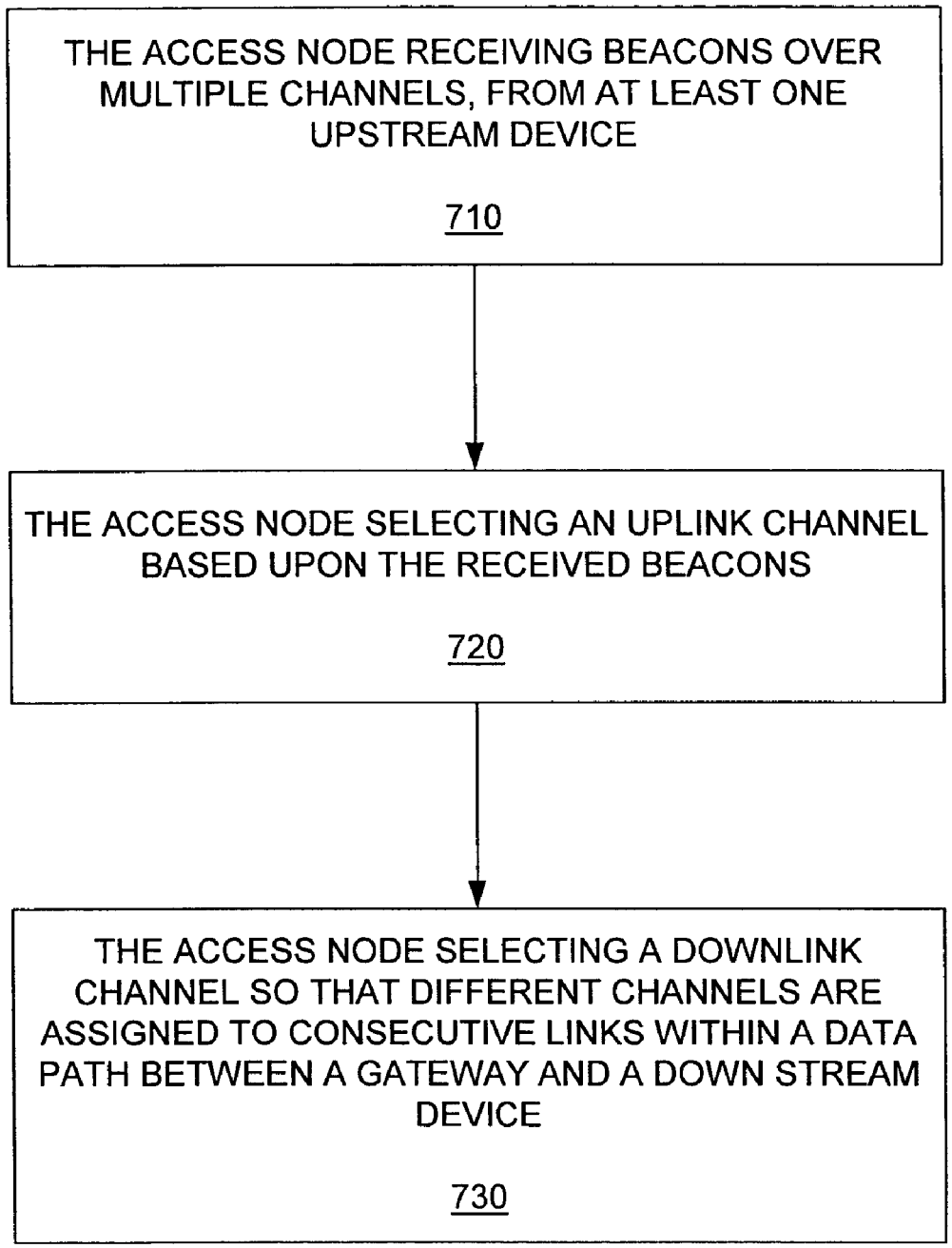
FIG. 8 shows steps included within a method of selecting channel assignments for links within a mesh network.

FIG. 8 shows steps included within a method of selecting channel assignments for links within a mesh network. A first step 710 includes the access node receiving beacons over multiple channels, from at least one upstream device. A second step 720 includes the access node selecting an uplink channel based upon the received beacons. A third step 730 includes the access node selecting a downlink channel so that different channels are assigned to consecutive links within a data path between a gateway and a down stream device.

Figure 9:
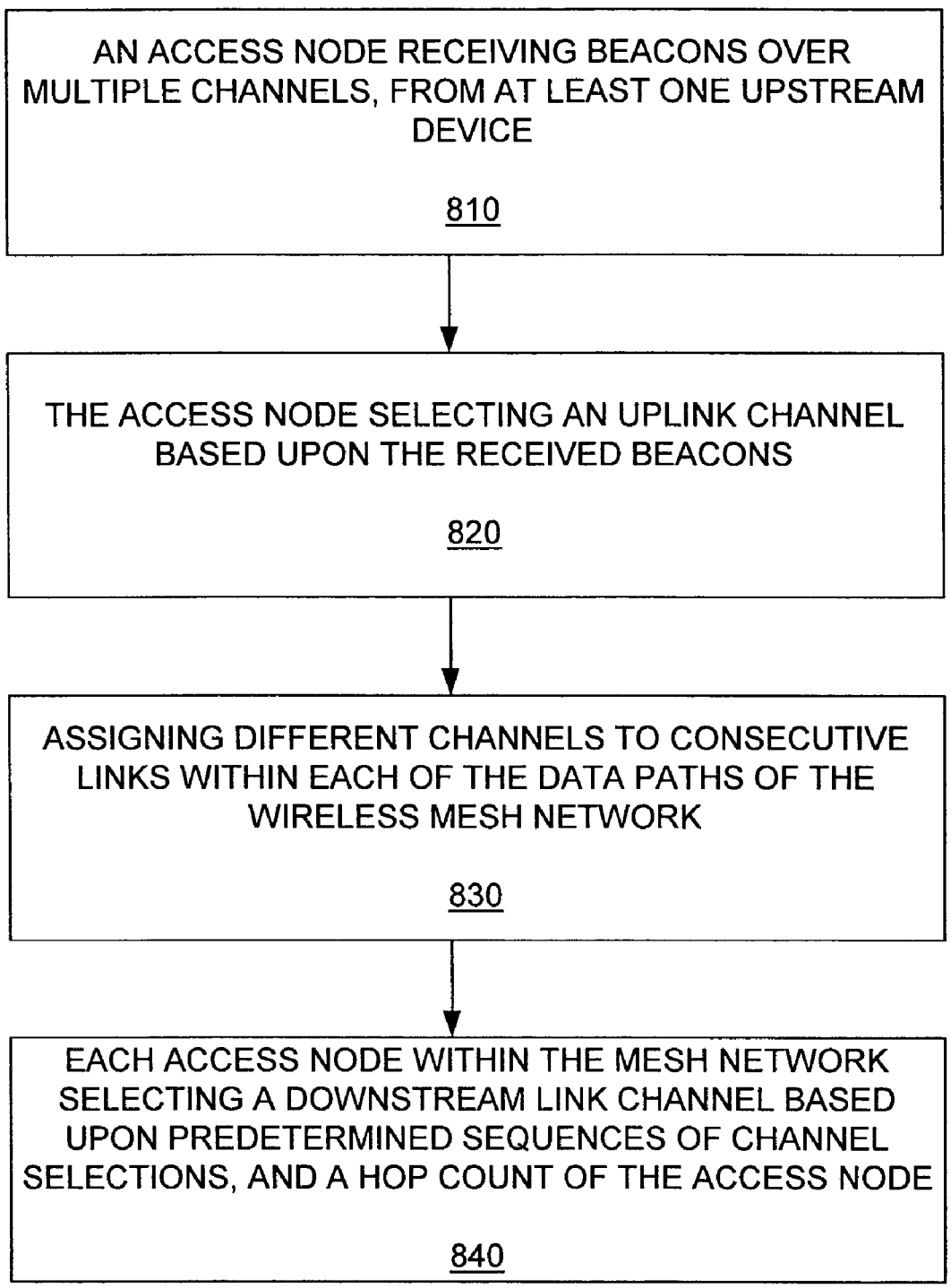
FIG. 9 shows steps included within another method of selecting channel assignments for links within a mesh network.

FIG. 9 shows steps included within another method of selecting channel assignments for links within a mesh network. A first step 810 includes an access node receiving beacons over multiple channels, from at least one upstream device. A second step 820 includes the access node selecting an uplink channel based upon the received beacons. A third step 830 includes assigning different channels to consecutive links within each of the data paths of the wireless mesh network. A fourth step 840 includes each access node within the mesh network selecting a downstream link channel based upon predetermined sequences of channel selections, and a hop count of the access node.

Although specific embodiments of the invention have been described and illustrated, the invention is not to be limited to the specific forms or arrangements of parts so described and illustrated. The invention is limited only by the appended claims.

What is claimed:

1. A method of assigning a channel to a link of an access node within a wireless mesh network, comprising:
the access node receiving beacons over multiple channels, from at least one upstream device;
the access node selecting an uplink channel based upon the received beacons;
the access node selecting a downlink channel so that different channels are assigned to consecutive links within a data path between a gateway and a down stream device, and based upon predetermined sequences of channel selections and a hop count of the access node, wherein the data path includes all links between the downstream device and the gateway.

2. The method of assigning channels of claim 1, wherein the access node simultaneously receives the beacons over multiple channels.

3. The method of assigning channels of claim 1, further comprising the access node receiving reverse beacons from the downstream device, and data path channel sequence selection is based upon channel preference information within the reverse beacons.

4. The method of assigning channels of claim 1, wherein the different channels comprise non-overlapping channels.

5. The method of assigning channels of claim 1, wherein at least some of the different channels comprise at least partially overlapping channels.

6. The method of assigning channels of claim 1, wherein a gateway originates the beacons, and the access node routes data traffic.

7. The method of assigning channels of claim 1, wherein the access node selecting an uplink channel base upon the received beacons comprises determining a path quality of the uplink channel based on a persistence of received beacons, and wherein if a beacon is not received during a routing cycle, the path quality is decreased, and further comprising the access node re-transmitting the beacon over the selected downlink channel if the path quality is sufficiently high.

8. The method of assigning channels of claim 7, wherein the channels are frequency channels, and non-overlapping channels occur first in the predetermined sequence, and overlapping channels, occur at an end of the predetermined sequence.

9. The method of assigning channels of claim 8, wherein the predetermined sequence is at least one of 1-6-11-3-8, 11-6-1-8-3, 1-7-13-4-10, 13-7-1-10-4, 1-8-14-4-11, 14-8-1-11-4, 1-7-14-4-10 and 14-7-1-10-4 channels of an 802.11(b) protocol.

10. The method of assigning channels of claim 8, wherein the predetermined sequence repeats if the number of links within the data path is greater than a number of channels within the predetermined sequence.

11. The method of assigning channels of claim 7, further comprising the access node receiving reverse beacons from the downstream device, and predetermined sequence selection is based upon channel preference information within the reverse beacons.

12. The method of assigning channels of claim 1, wherein channels include at least one of frequency channels, different spreading codes in a spread-spectrum CDMA system, different polarizations of the transmitted waveform, different spatial signatures as determined by a smart antenna or adaptive antenna array at the receiver.

13. The method of assigning channels of claim 1, wherein channels are frequency channels that include frequency bands as specified by an 802.11 protocol.

14. The method of assigning channels of claim 1, wherein the channels are frequency channels, and a first hop of the data path is at an opposite end of a frequency spectrum of the frequency channels as a second hop of the data path.

15. The method of assigning channels of claim 1, wherein the data path begins at a gateway that originates beacons.

16. The method of assigning channels of claim 15, wherein the beacons are retransmitted at each receiving access node, and include channel selection information of an upstream data path.

17. The method of assigning channels of claim 1, wherein the gateway is wirelessly connected to a network.

18. The method of assigning channels comprising:
the access node receiving beacons over multiple channels, from at least one upstream device;
the access node selecting an uplink channel based upon the received beacons;
receiving channel assignment information of which of available channels have been selected in an upstream data path of the access node
the access node selecting a downstream link channel based upon predetermined sequences of channel selections, and the channel assignment information, wherein the data path includes all links between the downstream device and the gateway.

19. A method of assigning channels to links of data paths within a wireless mesh network, comprising:
an access node receiving beacons over multiple channels, from at least one upstream device;
the access node selecting an uplink channel based upon the received beacons; and
assigning different channels to consecutive links within each of the data paths of the wireless mesh network and based upon predetermined sequences of channel selections and a hop count of the access node.

20. The method of assigning channels of claim 19, further comprising:
each access node within the mesh network selecting a downstream link channel based upon the predetermined sequences of channel selections, and the hop count of the access node.

21. The method of assigning channels of claim 19, wherein the access node simultaneously receives the beacons over multiple channels.

22. The method of assigning channels of claim 20, further comprising the access node receiving reverse beacons from the downstream device, and predetermined sequence selection is based upon channel preference information within the reverse beacons.

23. The method of assigning channels of claim 19, wherein a gateway originates the beacons, and the access node routes data traffic.

24. The method of assigning channels of claim 20, further comprising:
each access node within the mesh network receiving channel assignment information of which of available channels have been selected in an upstream data path of the access node,
each access node selecting a downstream link channel based upon predetermined sequences of channel selections, and the corresponding channel assignment information.

25. The method of assigning channels of claim 19, wherein channels are frequency channels that include frequency bands as specified by the 802.11 protocol.

26. The method of assigning channels of claim 19, wherein the channels are frequency channels, and a first hop of each data path is at an opposite end of a frequency spectrum of the frequency channels as a second hop of the data path.

27. The method of assigning channels of claim 19, wherein the channels are frequency channels, and non-overlapping channels occur first in the predetermined sequence, and overlapping channels occur at an end of the predetermined sequence.

28. The method of assigning channels of claim 24, wherein the predetermined sequence repeats if the number of links within the data path is greater than a number of channels within the predetermined sequence.

29. The method of assigning channels of claim 19, wherein the beacons are retransmitted at each receiving access node, and include channel selection information of an upstream data path.

30. The method of assigning channels of claim 23, wherein the gateway is wirelessly connected to a network.

* * * * *